United States Patent [19]

Warner et al.

[11] Patent Number: 4,847,501

[45] Date of Patent: Jul. 11, 1989

[54] OCCUPANCY DETECTOR

[76] Inventors: Kenneth Warner, 41 The Chase, Penns Park, Sutton, Coldfield; Robert J. Westwood, 4 Denleigh Road, Kings, Winford, both of United Kingdom

[21] Appl. No.: 127,076

[22] Filed: Dec. 1, 1987

[30] Foreign Application Priority Data

Dec. 1, 1986 [GB] United Kingdom ............... 8628635
Mar. 5, 1987 [GB] United Kingdom ............... 8705138

[51] Int. Cl.$^4$ .............................................. G01J 5/04
[52] U.S. Cl. ...................................... 250/342; 250/353
[58] Field of Search .................... 250/353, 342, 338 B; 340/567, 600

[56] References Cited

U.S. PATENT DOCUMENTS 4,087,688  5/1978  Keller .................................. 250/342
4,670,655  6/1987  Zierhut ............................... 250/342
4,716,294 12/1987  Pettke et al. ........................ 250/353

FOREIGN PATENT DOCUMENTS 2836462  3/1980  Fed. Rep. of Germany ...... 340/600

Primary Examiner—Janice A. Howell
Assistant Examiner—Constantine Hannaher
Attorney, Agent, or Firm—Rogers, Howell, Moore & Haferkamp

[57] ABSTRACT

An occupancy sensor device has a housing with a neck entry affording a light path to a recessed sensor. The interior of the light path has properties of reflection and/or refraction to improve effective field of view of the sensor. A tubular member as the neck can be angularly adjustable for selective electrical connection to a circuit board carrying the sensor and contacts at its end. That board can be clamped in slots in an inner part of the housing. Fitting to a barrier can be aided by clenching action of a spring member apertured to grip an outer housing part when relaxed.

9 Claims, 3 Drawing Sheets

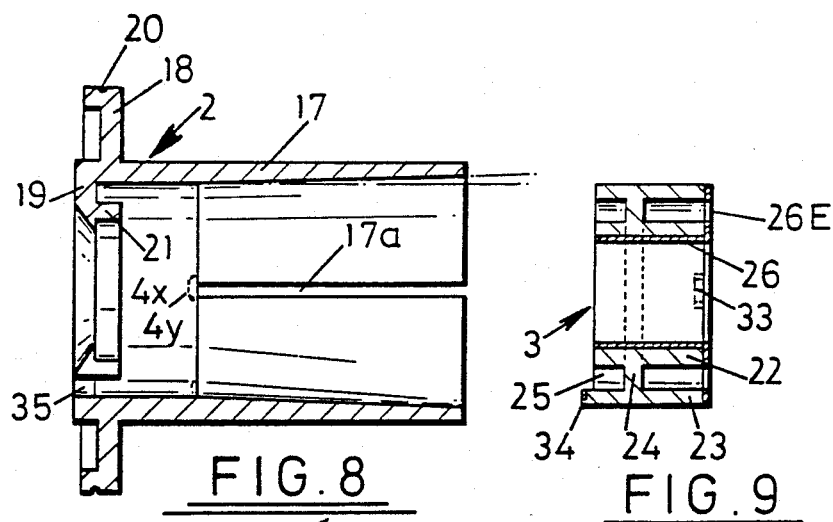
FIG. 8
FIG. 9
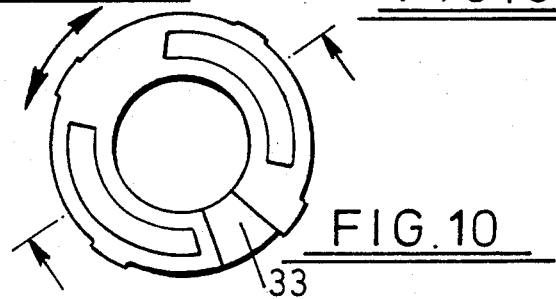
FIG. 10
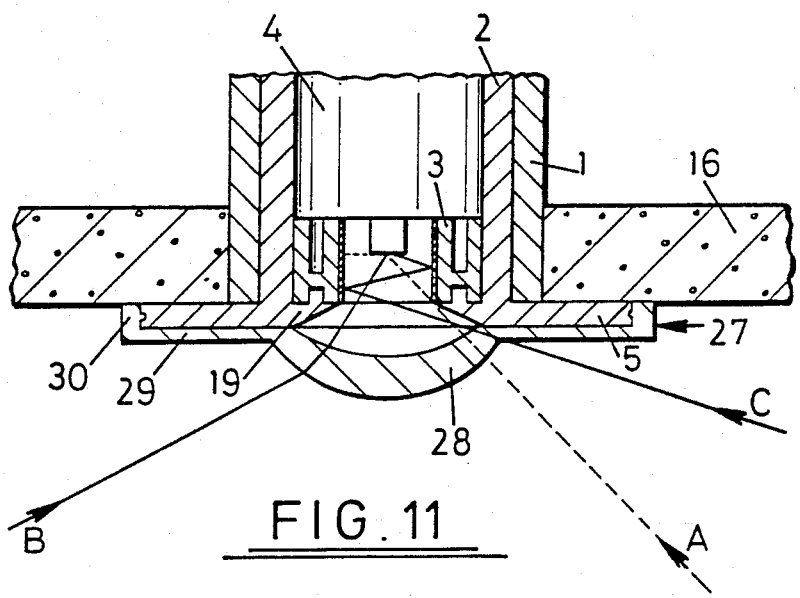
FIG. 11

OCCUPANCY DETECTOR

This invention in its various aspects arises in relation to occupancy detectors, though at least one aspect is potentially of wider application.

That aspect of the present invention concerns fixing an object, such as an occupancy detector, in abutment with an apertured barrier, such as a ceiling or ceiling tile, with a part of the object passing through an aperture in the barrier, and comprises using a resilient spring member to fit about and grip said part in its relaxed state but capable of flexing to be free of said part for moving towards the barrier at its other side and serving to hold the object in position, usefully then with abutment also of parts of the relaxed or partly relaxed spring member against such other side of the barrier.

An object with a flange for abutment purposes is suitably, as applies to the preferred occupancy sensor housing hereof, and can afford a drawing or clenching or clamping action on the object relative to the barrier, particularly for aiding gap-less sealing of the flange. Otherwise, retention of an elongate object could additionally include fitting one spring member on each side of the barrier.

This aspect of the present invention has method, installed object, and spring member connotations.

A preferred spring member comprises a deformable resilient member having an opening shaped so that said part can be loosely fitted through the opening only when the plate is flexed. A suitable spring member comprises an arcuate plate flexed as aforesaid by reduction of its curvature. Then, in order to allow such a plate to be more easily flexed, a pair of angled parts can extend from the arcuate part of the member in which the opening is formed, and may extend from one side of the arcuate plate away from said barrier at installation and be one at each end, so that bends or corners abut on said barrier as installed.

According to another aspect of the invention an elongate occupancy sensor housing has separable inner and outer parts with longitudinal formations from one end of the inner part to accommodate edges of a printed circuit board carrying the control sensor at one end. Where the formations are slots, the outer part may engage closely over the inner part to close the slots clampingly onto edges of the circuit board. A suitable outer part is generally cylindrical and opens only at one end save for wire access provision. A suitable inner part is flanged at its other end. For such parts, the flange of the inner part may butt onto the open end of the outer part.

According to a particularly preferred aspect of the invention an occupancy sensor housing construction has an opening as a neck whose inner surface defines a lightpath along its length, an infra-red sensitive sensor located recessed in the housing at or towards the inboard end of the lightpath, and wherein refractive or reflective properties of the interior of said neck serve as a performance modifier to improve effective field of view of the sensor. One or more supplementary performance modifiers may be fitted to the sensor construction at the entry to the lightpath, say as a lens or reflective cowl to affect field of view.

Performance modifiers may be used that additionally or alternatively alter operating spectrums for received signals. In general, for supplementary performance modifiers, transparent or translucent refractive systems can be fitted in or across the lightpath and/or one or more reflective surfaces define a boundary or entry for the lightpath.

The housing neck is preferably as an insert tube and carries conductive material for selectively interconnecting contacts typically on the end of the circuit board) depending on the angular position of the tube which may be adjusted from outside the housing. The contacts can usefully serve in conjunction with appropriate electronic circuitry to reduce a reset period of the occupancy sensor device for test purposes.

The use of an angularly adjustable generally rotary element carrying conductive material, preferably of light reflective type and purpose, constitutes another aspect of this invention.

Preferred infra-red sensitive sensors have associated signalling means capable of transmitting a signal or a series of signals when an operating source of infra-red radiation is detected. These signals may go onto wiring to a control unit for operating an alarm and/or switching on lights.

Implementation of this invention will now be described, by way of example only, with reference to the accompanying drawings, in which:

FIG. 8 is a cross sectional view of an aperture tube;

FIG. 9 is a cross sectional view of a light path tube;

FIG. 10 is a bottom view of the light path tube; and

FIG. 11 is a cross sectional view of part of a passive infra-red sensor device with a lens fitted.

Figure 1:
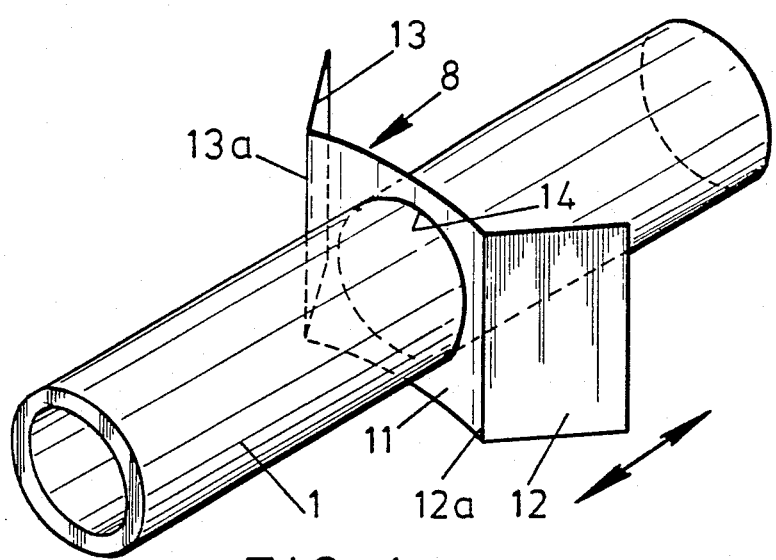
FIG. 1 is a perspective view of a resilient fixing spring member as fitted to part of a housing.

In FIG. 1, a tubular object 1, actually part of a plastics moulded sensor housing, is fitted with a resilient metal fixing spring member 8. The spring member 8 comprises a central arcuate part 11 with a pair of end parts 12, 13, one projecting from each of the opposite straight edges of the plate 11, actually bent away from those edges oppositely to curvature of the plate 11.

Figure 2:
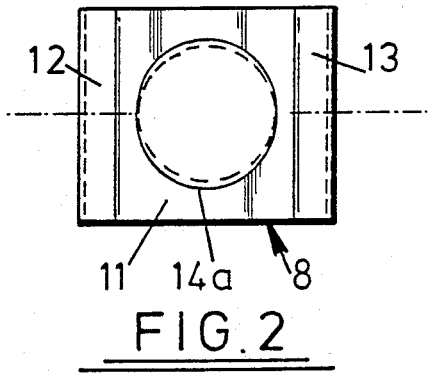
FIG. 2 is a front elevation of the resilient fixing spring member when relaxed.
Figure 4:
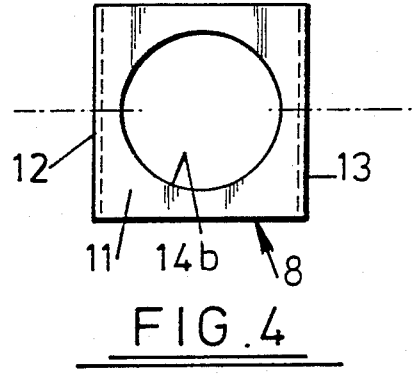
FIG. 4 is a front elevation of the resilient fixing spring member when flexed.
Figure 3:
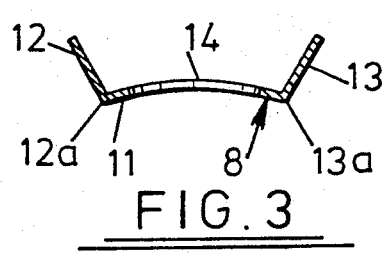
FIG. 3 is a cross sectional plan view of the resilient fixing spring member seen in FIG. 2.
Figure 5:
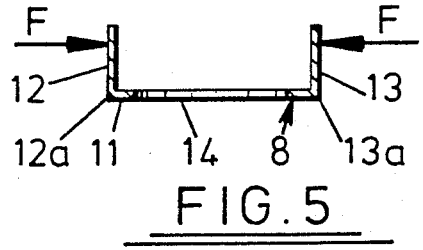
FIG. 5 is a cross sectional plan view of the resilient fixing spring member seen in FIG. 4.

The spring member 8 is conveniently of unitary metal construction, made from centrally apertured plate bent to shape and set as appropriate. In FIGS. 2 and 3, the spring member 8 is shown in its relaxed state where a circular central hole appears elliptical (14a) in plan. In FIGS. 4 and 5, the spring member 8 is shown in a flexed state. Equal but opposite compression forces, indicated by arrows F—F, are applied one to each of the end parts 12, 13 to bring them substantially parallel. Consequently the central part 11 becomes substantially flat and its central hole is circular in plan, see 14b.

It will of course be appreciated that, if it is required to fix a spring member 8 to a housing 1, the spring member 8 must be flexed until the hole 14 is a clearance about the housing 1, the flexed spring member 8 then being fitted around the housing 1 and allowed to relax by release of the compression forces.

In the present example, the spring member 8 may be fixed to any circular housing having a diameter between its minimum and maximum diameters appearing elliptical. However, housings of other than circular cross-section can be secured if the opening in the spring member is correspondingly shaped.

Where the housing 1 has an end flange to be on one side of a barrier opposite to the spring member, the action of relaxing the spring member 8 enables its bends 12a, 13a to draw the flanged end onto the barrier if the flexed spring member is butted to its other side.

Figure 6:
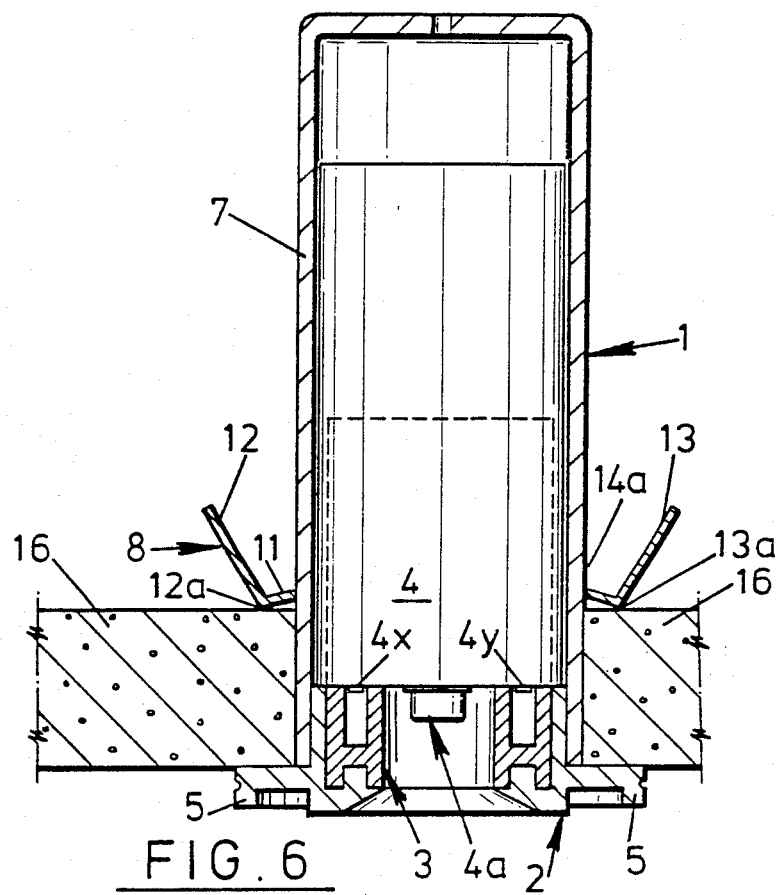
FIG. 6 is a cross sectional view of a passive infra-red sensor device fitted through a ceiling.

FIG. 6 shows a sensor the general construction of which comprises a vertically arranged sensor housing 1, having an aperture tube 2 fitted in its lower end, an infra-red sensitive sensor system 4 fitted within the body of the housing 1 and vertically separated from the lower end of the aperture tube 2 by means of a spacer ring 3. The sensor housing 1 is fitted through a circular opening 15 in a suspended ceiling tile 16 and retained in that position by means of the fixing spring member 8 attached to the housing 1 above the ceiling 16. The housing 1 is vertically positioned so that a flange 5, on the lower end of the aperture tube 2, abuts with the underside of the ceiling 16 and is preferably drawn thereagainst by the corners 12a, 13a of the spring member.

The sensor system 4 is conveniently a printed circuit board carrying a sensor cell 4a at one end and bearing electronic sensing circuitry. In the drawing, the sensor is shown diagrammatically and flanked by two contacts, preferably of curved spring leaf form see 4x, 4y. The electronic arrangement as such does not form part of the present invention, but the purpose of the contacts 4x, 4y is of interest as, once bridged, they will serve the purpose of automatically reducing a time interval otherwise effective for the circuitry to go to a reset condition after last sensing an occupant. This reduction in time is particularly useful in controlling lighting systems. That reduction of interval particularly facilitates speedy testing after installation.

Figure 7:
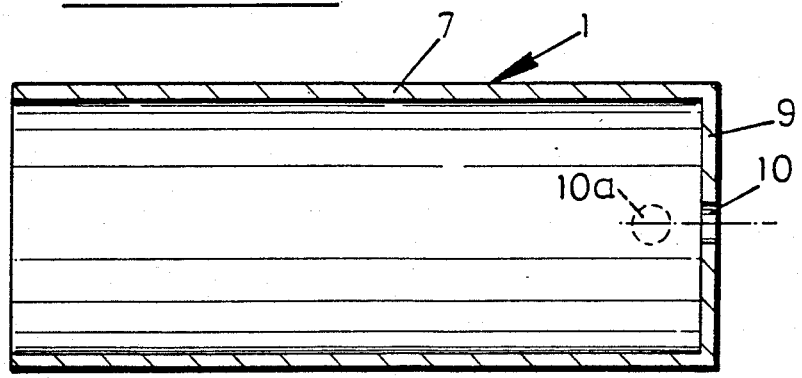
FIG. 7 is a cross sectional view of a sensor device housing.

The sensor housing 1, as seen in FIG. 7, comprises a plastics moulded tube 7 closed at one end by an integrally moulded circular end wall 9. The plastics material may be of fire-resistant type.

In one specific example, the housing 1 has an external diameter of approximately 42 mm, an external length of approximately 110 mm and a wall thickness of between approximately 2.0 and 2.5 mm, and the spring member is of steel 0.2 to 1 mm plate measuring (as viewed in FIGS. 2 and 3) 60 mm in height, 50 mm in chordal width, 60 mm radius of curvature and a 43 mm diameter hole reducing to 41 mm minimum (elliptical).

It is highly desirable that a ceiling mounted sensor should be as inconspicuous as reasonably possible when viewed from below. To this end, the circular wall 9 has at least one opening 10, the area of which is large enough to accomodate one or more electrical power supply and/or signalling cables (not shown). In this case, a single hole concentric with the axis of the housing is formed in the circular end wall 9. Such a hole 10 has a diameter of between approximately 2 and 5 mm. If the distance between a false ceiling and a ceiling proper is only slightly greater than the length of the housing then any power supply hole or holes 10 would pass through the wall of the tube, say via knock-outs, see dashed at 10a.

The aperture tube 2 is also a moulded plastics structure, as seen in FIG. 8. It generally comprises a sensor-retaining tube 17 shorter than the housing 1, say having a length of approximately 58.5 mm in the specific example and having an external diameter, say of approximately 38 mm, so that it is a close-fit, preferably a tight friction-fit, within the housing 1. Diametrically opposite formations shown as slots, see 17a, usefully serve in accepting side edges of the circuit board 4. As slots, some then close clampingly upon circuit board edges at fitting of the tube 17 into the housing 1.

The retaining tube 17 has an outer flange 18 and an inner aperture flange 19 integrally moulded at or near to its outer end. The outer flange 18 has a greater diameter than the housing 1, say approximately of 60 mm, and is shown with a continuously indented surface having an outwardly open groove 20 for retaining any optical performance modifiers in position across the lightpath. The aperture flange 19 surrounds an opening of lesser diameter than the housing 1, say of approximately 17 mm. The radially inward face of the aperture flange 19 is shown with an outwardly divergent conical surface to aid effective field of view, say at approximately 60 degrees. Inside the aperture flange 19 is an integrally moulded retaining lip 21 which projects a short distance from the flange 19 and serving to retain the spacer ring 3 in position, say with minimum and maximum diameters of approximately 22 mm and 26.5 mm for the lip 21.

The inside face of the sensor retaining tube 17 is shown, from a point approximately 17 mm from its aperture end, as being slightly conical so that the internal diameter of the tube 17 is slightly greater at the interior end than at the centre, say with an angle of divergence of approximately 1 degree.

Referring now in FIG. 9, the spacer ring 3, which may have a maximum diameter of approximately 33 mm and a length of approximately 14.5 mm in the specific example, is seen in cross section. The spacer ring 3 consists of a plastics (say ABS) moulded construction comprising an inner ring 22, say with a minimum diameter of approximately 17 mm, coaxial with but separated from an outer ring 23 by means of an annular rib 24. The channel 25 formed at the aperture end between the walls 22, 23 and the rib 24 is adapted to receive the lip 21 on the inside of the aperture flange 19 so that the aperture tube 2 and the spacer ring 3 can be firmly and accurately held together.

The inward face of the inner ring 22 is shown covered with a thin reflective metal coating 26, say of either chrome or a predominantly chrome-based alloy having a thickness of approximately 0.04 mm. In this example the coating 26 covers not only the entire inward face but also at least into the inner end face at 26E. The function of the reflective coating 26 is to increase the field of view of the sensor (as illustrated in FIG. 11), and the function of the end coating 26E is to selectively interconnect the contacts 4x, 4y.

The latter effect is due to an indent (see 33 in FIG. 10 and dashed in FIG. 9) that will take one of the contacts 4x, 4y with a clearance, i.e. out of electrical contact with the coating 26E. Angular adjustment of the ring 3 allows making of contact (to the counter-clockwise side of the indent 33 in FIG. 10). An indented adjuster lug 34 is shown for that purpose and will be accessible through an arcuate slotted aperture in the flange 19 (see at 35 in FIG. 8).

FIG. 11 is similar to FIG. 6 and components common to both drawings will not be described afresh.

An infra-red sensitive sensor construction is arranged to be fitted through a vertical opening in a false ceiling 16. An aperture tube 2, having a flange 5 which abuts with the ceiling 16, is incorporated into the construction and has a substantially transparent refractive performance modifier 27 fitted to it.

The refractive performance modifier 27 comprises a convex lens portion 28 fitted coaxially across the lightpath, an annular plate 29 integral with the circumferential edge of the convex lens portion, and a flange 30 integral with and upwardly projecting from the outer edge of the annular plate 29 so that a ridge 31 inwardly projecting from the flange 30 can fit into an outwardly open groove 20 formed in the outer flange 18 of the aperture tube 2. Compared to the field of view of the sensor construction illustrated in FIG. 6 a refractive performance modifier increases the field of view. It will of course be appreciated that the actual field of view may be readily determined for any particular example.

Arrow "A" represents a lightray situated at the extreme edge of the field of view of a sensor construction which does not incorporate a refractive or a reflective optical performance modifier.

Arrow "B" represents a lightray situated close to the extreme edge of the field of view of a sensor construction incorporating only a refractive optical performance modifier.

Arrow "C" represents a lightray situated close to the extreme edge of the field of view of a sensor construction incorporating only a reflective optical performance modifier.

Thus, it will be appreciated that a considerable increase in the field of view of a sensor construction may be effected by incorporating either a refractive and/or a reflective optical performance modifiers.

It will also be appreciated that the invention is not limited in scope to a simple lens, as Compound lenses may also be incorporated into the sensor construction.

In addition, the sensor cell may be sensitive to forms of electromagnetic radiation other than infra-red radiation.

We claim:

1. An occupancy sensor device comprising a housing having an opening, a neck extending into the housing, an infra-red sensor located recessed in the housing to receive radiation from a light path bounded by interior surface of said neck contributing by at least one of refraction and reflection properties aiding collection of infra-red radiation from effective field of view of the sensor, said neck comprising a tube member of electrically insulating material coated with electrically conducting material and being angularly movable to afford selective electrical connections relative to a circuit board within said housing.

2. An occupancy sensor device according to claim 1, wherein said tube member has its in-board end coated with electrically conductive material and formed to afford said selective connections according to angular position.

3. An occupancy sensor device according to claim 1, wherein one selectable conductive connection serves for test purposes by reducing a normal rest period for the device.

4. An occupancy sensor device comprising a housing having an opening, a neck extending into said housing, an infra-red sensor located recessed in the housing to receive radiation from a light path bounded by interior surface of said neck, which interior surface contributes by at least one of refraction and reflection properties aiding collection of infra-red radiation from effective field of view of the sensor, said housing comprising separable inner and outer parts of which the inner part has longitudinal formations to accommodate printed circuit board edges, such printed circuit board carrying said sensor at one end.

5. An occupancy sensor device according to claim 4, wherein the longitudinal formations are slots from one end of said inner part, and said outer part engages closely over said inner part to close said slots clenchingly onto said printed circuit board edges.

6. An occupancy sensor device comprising a housing having an opening, a neck extending into said housing, an infra-red sensor located recessed in the housing to receive radiation from a light path bounded by interior surface of said neck, which interior surface contributes by at least one of refraction and reflection properties to aiding collection of infra-red radiation from effective field of view of the sensor, said housing having a flange to abut adjacent boundary of an aperture in a barrier through which part of said housing will pass, and a resilient spring member to fit about and grip said part in its relaxed state but capable of flexing to be free of said part for moving towards the barrier at its side opposite to that to be engaged by said flange, and serving to hold said housing in desired abutting position.

7. An occupancy sensor according to claim 6, wherein, as installed in said barrier, said spring member affords a positive clenching action.

8. An occupancy sensor device according to claim 6, wherein said spring member is an arcuate spring plate with an opening to grip and release on said part of the housing according to flexure of said spring plate.

9. An occupancy sensor device comprising a housing having an opening, a neck extending into the housing, an infra-red sensor located recessed in the housing to receive radiation from a light path bounded by interior surface of said neck, which interior surface contributes by at least one of refraction and reflection properties to increased collection of infra-red radiation to which the sensor is responsive on a non-selective basis.

* * * * *

UNITED STATES PATENT OFFICE
CERTIFICATE OF CORRECTION

Patent No. 4,847,501   Dated  July 11, 1989

Inventor(s)  Warner, Kenneth; Westwood; Robert J.

It is certified that error appears in the above-identified patent and that said Letters Patent is hereby corrected as shown below:

Add
On the Title Page:

ASSIGNEE:  Legrand Electric Limited

Bedfordshire, ENGLAND

Signed and Sealed this

Twenty-sixth Day of June, 1990

Attest:

HARRY F. MANBECK, JR.

*Attesting Officer*        *Commissioner of Patents and Trademarks*